April 4, 1944.  K. J. MYSELS  2,346,043
PIPE LINE LEAK DETECTING METHOD
Filed March 2, 1942
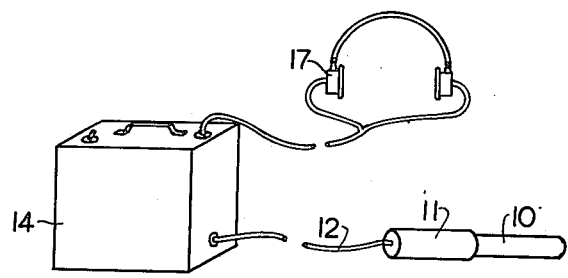
Fig. I
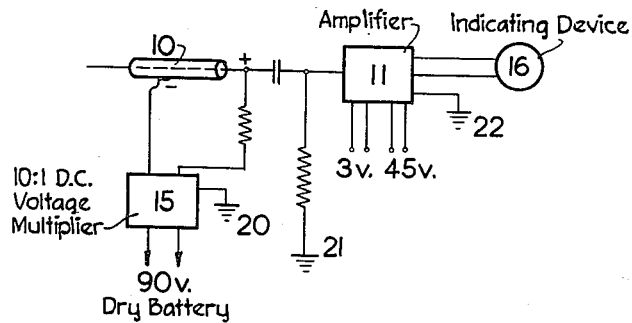
Fig. II
Inventor: Karol J. Mysels
By his Attorney:

Patented Apr. 4, 1944

2,346,043

UNITED STATES PATENT OFFICE 2,346,043

PIPE-LINE LEAK DETECTING METHOD

Karol J. Mysels, San Francisco, Calif., assignor to Shell Development Company, San Francisco, Calif., a corporation of Delaware Application March 2, 1942, Serial No. 433,018

9 Claims. (Cl. 250—83.6)

The present invention relates to methods of locating leaks in pipe lines and pertains more particularly to a sensitive and rapid method of finding leaks in buried or partially buried pipe lines.

Generally, in crude oil and water lines leaks are quickly disclosed to line walkers since these liquids readily seal porous soils and eventually form a leak-obstructing wall under the line which diverts the pressure upwards, whereupon the stain on the ground surface is easily detected.

However, in finished products lines, such as gasoline pipe lines, as well as in gas lines and sometimes even in crude oil and water lines under certain highly-fissured soil conditions, line walkers consistently overlook leaks that are known to exist as indicated by pressure drops and downstream station shortages. Particularly in lines carrying gasoline, which does not coagulate soils, the probability of finding leaks is remote, for example, in terrain where the pipe cover is dense clay, with an underlying ditch of loose material such as sand, and a leak often runs for weeks without being discovered.

It is therefore an object of this invention to provide a simple and rapid method of detecting leaks in buried or partially buried pipe lines.

It is another object of this invention to provide a sensitive method of detecting leaks in pipe lines, whereby small leakages can be detected before growing to more serious proportions.

These and other objects of the invention will be readily apparent from the following description taken in reference to the attached drawing, wherein:

Figure I is a schematic view of one form of portable detecting apparatus which may be used in the method of the present invention.

Figure II is a diagram of the electrical connections for operating the portable detecting apparatus shown in Figure I.

The method of the present invention, being particularly applicable to gasoline pipe lines, will be described in relation thereto and comprises the steps of introducing, preferably into a small portion of the gasoline flowing through the pipe line, a soluble radioactive substance, moving this radioactive substance-bearing portion or slug of gasoline through the length of the pipe line, whereby a part of the radioactive solution flows out through any leaks in the pipe and forms a radioactive deposit concentrated adjacent said leaks, and subsequently measuring the intensity of emanations from radioactive material above and along the length of the pipe, whereby an increase in intensity of the emanations indicates the location of a leak in the pipe line.

If desired, to prevent too extensive mixing of the main portion of the radioactive material with the rest of the gasoline or liquid in the pipe line, the slug of radioactive gasoline may be isolated by introducing into the pipe line at each end of the slug a resilient plug, such as a rubber "squeegee" pipe line cleaner.

The radioactive material is preferably introduced into the pipe line in solution in a solvent miscible with the liquid flowing through the pipe line, which solvent may be a portion of the flowing liquid itself. Any suitable radioactive material may be used. For example, elements preferably giving off strong emanations of hard gamma rays, such as radium, uranium, thorium, and other naturally-occurring radioactive elements as well as artificially produced radioactive elements, such as zinc, iron, copper, etc., in the form of hydrocarbon-soluble compounds, such as soaps, are suitable for use in hydrocarbon carrying pipe lines. In gas lines suitable radioactive gases, such as radioactive nitrogen, radon, etc., may be used. It is likewise preferable that the radioactive material have a half-life substantially not in excess of the time of passage through the pipe line.

It will be apparent that it is not necessary that the slug of gasoline containing the radioactive substance be moved all the way through the whole length of the pipe line before a surface survey for concentrations of emanations is started. It is sufficient that enough gasoline be passed into the pipe line after the slug of activated material to insure that the radioactive substance is substantially washed out from inside the pipe line, leaving only significant deposits or concentrations of radioactive material outside the pipe line at the points of leakage. It is therefore evident that the step in the present method of measuring the emanations along the pipe can be started after a reasonable amount of gasoline has been pumped into the pipe line after the introduction of the radioactive substance.

The step of measuring the intensity of the emanations is best carried out by means of a suitable electric counter of the ionization chamber or Geiger-Muller type, which is well known to the art, and a suitable portable device of this type will therefore only be described briefly herein. Referring to Figures I and II of the drawing, the counting tube or ionization chamber 10 and a vacuum tube amplifier 11 are contained in a small tubular unit (Figure I) that is attached to the power supply by a flexible cable 12. The power supply (i. e. 3 volts and 45 volts) for the amplifier 11 and the high voltage supply (i. e. 900 volts) come from small dry batteries contained in the carrying case 14 (Figure I). The 900-volt supply may be obtained, for example, from a 90-volt dry battery, by means of a suitable ten-to-one D. C. voltage multiplier 15 (Figure II). The discharges of the counter or ionization chamber 10 are received by an indicating device 16, which may be a neon or argon glow lamp or a telephone head set 17 (Figure I) worn by the operator, the discharges in the latter case being heard as sharp clicks. The whole apparatus is suitably insulated and properly grounded as at 20, 21 and 22 in a manner well known to those familiar to the electric art.

It will be readily apparent that various other arrangements or devices for measuring the intensity of the emanations of the concentrations of the radioactive material may be used and various modifications of the device shown may be made without departing from the spirit of the invention as defined by the accompanying claims. For example, a plurality of counters or ionization chambers 10 arranged and held during the survey in a horizontal line transverse to the pipe line may be used to detect concentrations of radioactive material directly underneath the pipe line, the two wall thickness of which may sufficiently shield the concentration of radioactive material from a single counter 10 held directly above the pipe.

Under some circumstances it may be advisable to obtain a record of the normal variations in intensity of emanations of radioactive material along the pipe line, and this record may be used as a reference when surveying the pipe line for leaks, whereby false indications of leaks due to normal variations in the background intensity of emanations are eliminated.

Likewise, it is contemplated to make periodic inspections of pipe lines by means of the present method in order to detect small leaks before they grow to more serious proportions.

In cases where a leak is known to exist in the pipe line, as may be indicated by pressure drops and/or downstream pump station shortages, the present method may be used in conjunction with various other methods, particularly those methods which, for example, by means of pressure measurements at the ends of the line and intermediate high points, permit narrowing the location of the leak to a short section of the line. Under such conditions, as well as in other situations, it is sometimes advisable to increase the pressure in the pipe line while the slug of radio-active material is moving through the leaking section, so that there is obtained a greater concentration of radioactive material in the soil adjacent the leak.

Although the invention is particularly applicable to gasoline pipe lines, the present method may also be used to detect leaks in crude oil or water lines in cases where the usual visible indications of the location of leaks are not present or are found to be or suspected of being misleading, as in the case of highly-fissured formations having dense surface soil conditions, wherein the leaking liquid may wander underground along fissures for some distance before coming to the surface.

It will be readily seen that the present method of detecting leaks in pipe lines is so simple in its application that it can be easily used by the regular pipe lines operators and also has a sensitivity permitting the detection of relatively small leaks before the loss of liquid becomes exceedingly large.

While it is preferable to introduce radioactive material into only a small portion of the fluid flowing through the pipe line, the radioactive material may, if desired, be continuously added to the flowing fluid and the pipe line may be periodically surveyed with a gamma-ray counter or the like. It is apparent, however, that recovery of the radioactive material by precipitation, distillation, etc., from the preferred concentrated small portion or slug will be relatively easily accomplished but that treatment of all the fluid flowing through the line will be generally undesirable.

I claim as my invention:

1. A method of finding leaks in a pipe line through which fluid is flowing, comprising the steps of introducing soluble radioactive material into said flowing fluid allowing said material to become relatively uniformly distributed within the portion of said pipe line being tested and to accumulate outside said pipe line adjacent leaks therein, and measuring the intensity of emanations from radioactive material along the length of the pipe line, whereby an increase in said intensity indicates the presence of a leak.

2. A method of finding leaks in a pipe line through which fluid is flowing, said method comprising the steps of introducing into a portion of said flowing fluid radioactive material soluble in said fluid, moving said radioactive portion of fluid through the pipe line, allowing said material to become relatively uniformly distributed within the portion of said pipe line being tested and to accumulate outside said pipe line adjacent leaks therein, and measuring the intensity of emanations from radioactive material along the length of the pipe line, whereby an increase in said intensity indicates the presence of a leak in the pipe line at the point of increased intensity of emanations.

3. A method of finding leaks in a buried pipe line through which a hydrocarbon liquid is flowing, said method comprising the steps of introducing into a portion of said flowing liquid a hydrocarbon-soluble radioactive compound, moving said radioactive portion of liquid through the pipe line, allowing said material to become relatively uniformly distributed within the portion of said pipe line being tested and to accumulate outside said pipe line adjacent leaks therein, and measuring the intensity of emanations from said radioactive compound along the length of the pipe line, whereby an increase in said intensity indicates the presence of a leak in the pipe line at the point of increased intensity of emanations.

4. A method of finding leaks in a buried pipe line through which a hydrocarbon is flowing, comprising the steps of introducing for a short time into the flowing stream a hydrocarbon-soluble radioactive material, continuing the flow of hydrocarbon through the pipe line until the radioactive material is substantially removed from the pipe line, and subsequently obtaining above and along the length of the pipe line an indication of gamma ray emanations from the radioactive material which accumulates outside the pipe line adjacent leaks therein, whereby said leaks are located.

5. A method of finding leaks in a buried pipe line through which a hydrocarbon is flowing, comprising the steps of introducing a hydrocarbon-soluble radioactive material into the section of pipe line suspected of containing leaks, moving said radioactive material through said section of pipe line, applying increased pressure to the hydrocarbon in the pipe line while moving said radioactive material through said section of pipe line, whereby the radioactive material is forced out of the pipe line through leaks, continuing to flow hydrocarbon through said section of pipe line for substantially removing the remaining radioactive material therefrom, and obtaining indications of the intensity of emanations from radioactive materal above and along said section of pipe line, whereby relatively large increases in said intensity indicate the location of leaks.

6. In a radiological method of surveying a pipe line for the detection of leaks therein, the steps of admixing with the fluid flowing in the pipe line a charge of radioactive material, causing said charge to pass within and along the pipe line, allowing said material to become relatively uniformly distributed within the portion of said pipe line being tested and to accumulate outside said pipe line adjacent leaks therein, and subsequently ascertaining the intensity of radioactive emanations outside and along the pipe line; whereby a point of leakage is indicated by an increase at said point of said intensity of emanations.

7. A method of finding leaks in a buried pipe line through which a fluid is flowing, comprising the steps of introducing into the flowing stream a slug of radioactive material, continuing the flow of fluid through the pipe line until the radioactive material is substantially removed from the pipe line, and subsequently obtaining above and along the length of the pipe line an indication of the emanations from the radioactive material which accumulates outside the pipe line adjacent leaks therein, whereby said leaks are located.

8. A method of finding leaks in a pipe line through which fluid is flowing, comprising the steps of dispersing soluble radioactive material in said flowing fluid throughout at least a substantial portion of said pipe line, allowing the concentration of radioactive material to build up to significant proportions outside the pipe line adjacent leaks therein, and measuring the intensity of emanations from radioactive material along the length of said portion of the pipe line, whereby an increase in said intensity indicates the presence of a leak.

9. A method of finding leaks in a pipe line through which fluid is flowing, comprising the steps of introducing soluble radioactive material into said flowing fluid, flowing the fluid through the pipe line until said material becomes relatively uniformly dispersed within the portion of said pipe line being tested, allowing a significant concentration of radioactive material to be built up outside said pipe line adjacent leaks therein by leakage of fluid containing said radioactive material, and measuring the intensity of emanations from radioactive material along the length of said portion of the pipe line, whereby an increase in said intensity indicates the presence of a leak.

KAROL J. MYSELS.